United States Patent
Woo et al.

(10) Patent No.: US 10,747,684 B2
(45) Date of Patent: Aug. 18, 2020

(54) SEMICONDUCTOR DEVICE MANAGING ADDRESS MAPPING OF A SEMICONDUCTOR MEMORY DEVICE AND DATA STORAGE DEVICE INCLUDING THE SEMICONDUCTOR DEVICE

(71) Applicants: SK hynix Inc., Icheon (KR); Seoul National University R&DB Foundation, Seoul (KR)

(72) Inventors: Yeong Jae Woo, Seoul (KR); Sang Lyul Min, Seoul (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/129,399

(22) Filed: Sep. 12, 2018

(65) Prior Publication Data
US 2019/0188150 A1 Jun. 20, 2019

(30) Foreign Application Priority Data

Dec. 18, 2017 (KR) .................. 10-2017-0173788

(51) Int. Cl.
*G06F 12/10* (2016.01)
*G06F 12/1045* (2016.01)
*G06F 12/02* (2006.01)
*G06F 12/1009* (2016.01)

(52) U.S. Cl.
CPC ...... *G06F 12/1045* (2013.01); *G06F 12/0246* (2013.01); *G06F 12/1009* (2013.01); *G06F 2212/7201* (2013.01)

(58) Field of Classification Search
CPC .................. G06F 12/1045; G06F 12/1009
See application file for complete search history.

(56) References Cited

U.S. PATENT DOCUMENTS

| | | | |
|---|---|---|---|
| 5,404,485 A | 4/1995 | Ban | |
| 2012/0239854 A1* | 9/2012 | Hsueh | G06F 12/0866 711/103 |
| 2014/0304453 A1* | 10/2014 | Shao | G06F 12/0246 711/103 |
| 2014/0351498 A1* | 11/2014 | Hsueh | G06F 12/0866 711/103 |

(Continued)

FOREIGN PATENT DOCUMENTS

| | | |
|---|---|---|
| KR | 1020140062676 A | 5/2014 |
| KR | 101497860 B1 | 3/2015 |

OTHER PUBLICATIONS

"Nvm Express Specification 1.2.1", 2016, NVM Express, Inc., http://www.nvmexpress.org/specifications.

(Continued)

*Primary Examiner* — Than Nguyen

(57) ABSTRACT

A semiconductor device includes a mapping cache configured to cache mapping data stored in a memory device, and a cache controller configured to manage the mapping cache, wherein the mapping cache comprises a first cache including a plurality of cache blocks, each cache block storing first mapping information and a link for another cache block storing second mapping information having a relationship with the first mapping information.

15 Claims, 8 Drawing Sheets

(56) References Cited

U.S. PATENT DOCUMENTS

2016/0299710 A1* 10/2016 Chang ................ G06F 12/0246

OTHER PUBLICATIONS

"Raw NAND", 2015, SK HYNIX INC., http://www.hynix.com/eng/product/nandRaw.jsp.

"Samsung PM830 Solid State Drive", 2012, Samsung Semiconductor, Inc., http://www.samsung.com/us/business/oemsolutions/pdfs/PM830_MCE_Product%20Overview.pdf.

"SSD Extension for DiskSim Simulation Envionment", Mar. 6, 2009, Microsoft.

"UMassTraceRepository", Jun. 1, 2007, http://traces.cs.umass.edu/index.php/Storage/Storage.

NVMe SSD 960 PRO/EVO, 2016, pp. 1-4, Samsung lectronics Co., Ltd., http://www.samsung.com/semiconductor/minisite/ssd/downloads/document/NVMe_SSD_960_PRO_EVO_Brochure.pdf.

Aayush Gupta et al., "DFTL: A Flash Translation Layer Employing Demand-based Selective Caching of Page-level Address Mappings", ASPLOS '09, Mar. 7-11, 2009, pp. 229-240, ACM.

Chanik Park et al., "A High Performance Controller for NAND Flash-based Solid State Disk (NSSD)", 2006, IEEE.

Curtis E. Stevens, "Information technology—AT Attachment 8—ATA/ATAPI Command Set (ATA8-ACS)", May 21, 2007, pp. 1-422, Revision 4a, American National Standard Institute, Inc.

David Kroft, "Lockup-Free Instruction Fetch/Prefetchcache Organization", 1981, pp. 81-87, IEEE.

Dawoon Jung et al., "Superblock FTL: A Superblock-Based Flash Translation Layer with a Hybrid Address Translation Scheme", ACM Transactions on Embedded Computing Systems, Mar. 2010, pp. 1-41, vol. 9, No. 4, Article 40, ACM.

Donghee Lee et al., "LRFU: A Spectrum of Policies that Subsumes the Least Recently Used and Least Frequently Used Policies", IEEE Transactions on Computers, Dec. 2001, pp. 1352-1361, vol. 50, No. 12, IEEE.

Dushyanth Narayanan et al., "Write Off-Loading: Practical Power Management for Enterprise Storage", ACM Transactions on Storage, Nov. 2008, pp. 1-23, vol. 4, No. 3, Article 10, ACM.

Eyee Hyun et al., "Ozone (O3): An Out-of-Order Flash Memory Controller Architecture", IEEE Transactions on Computers, May 2011, pp. 653-666, vol. 60, No. 5, IEEE.

Harry Butler, "OCZ Vertex 120GB SSD", bit-tech, May 15, 2009, https://www.bit-tech.net/hardware/storage/2009/05/15/ocz-vertexssd-review/1.

Hyotaek Shim et al., "An Adaptive Partitioning Scheme for DRAM-based Cache in Solid State Drives", 2010, IEEE.

Jesung Kim et al., "A Space-Efficient Flash Translation Layer for Compactflash Systems", IEEE Transactions on Consumer Electronics, May 2002, pp. 366-375, vol. 48, No. 2, IEEE.

John S. Bucy et al., "The DiskSim Simulation Environment Version 4.0 Reference Manual", May 2008, pp. 1-89, Carnegie Mellon University.

Keith I. Farkas et al., "Complexity/Performance Tradeoffs with Non-Blocking Loads", 1994, pp. 211-222, IEEE.

Michael Wu, "DRAM-less SSD—The New Trend for Embedded System", Flash Memory Summit 2015, Phison Electronics Corp.

Nathan Binkert et al., "The gem5 Simulator", ACM SIGARCH Computer Architecture News, May 2011, pp. 1-7, vol. 39, No. 2.

Rino Micheloni, "3D Flash Memories", 2016, Springer.

Sang-Won Lee et al., "A Log Buffer-Based Flash Translation Layer Using Fully-Associative Sector Translation", ACM Transactions on Embedded Computing Systems, Jul. 2007, pp. 1-27 vol. 6, No. 3, ACM.

Seon-Yeong Park et al., "CFLRU: A Replacement Algorithm for Flash Memory", CASES '06, Oct. 23-25, 2006, pp. 234-241, ACM.

Sheng Li et al., "Performance Impacts of Non-blocking Caches in Out-of-order Processors", 2011, pp. 1-8, Hewlett-Packard Development Company, L.P.

Tom Feist, "Vivado Design Suite", Apr. 24, 2012, pp. 1-14, Version 1.0, XILINX.

Tony Park, "High Performance SSD &Benefit for Server Application", Flash Memory Summit, Aug. 12, 2008, INDILINX.

You Zhou et al., "An Efficient Page-level FTL to Optimize Address Translation in Flash Memory", EuroSys 15, Apr. 21-24, 2015, pp. 1-16, ACM.

Zhiwei Qin et al., "A Two-Level Caching Mechanism for Demand-Based Page-Level Address Mapping in NAND Flash Memory Storage Systems", 2011 17th IEEE Real-Time and Embedded Technology and Applications Symposium, 2011, pp. 157-166, IEEE.

Kevin Obrien, "OCZ Vertex 4 SSD Review", Apr. 4, 2012, Storage Review.com.

"Samsung SSD 840 Pro, Performance at a different level", 2013, Samsung Electronics.

"Samsung SSD 850 Pro", Aug. 2014, Samsung Electronics Co., Ltd.

"SCSI Architecture Model-5 (SAM-5)," Jul. 22, 2015, 215 pages, American National Standards Institute, New York, USA.

* cited by examiner

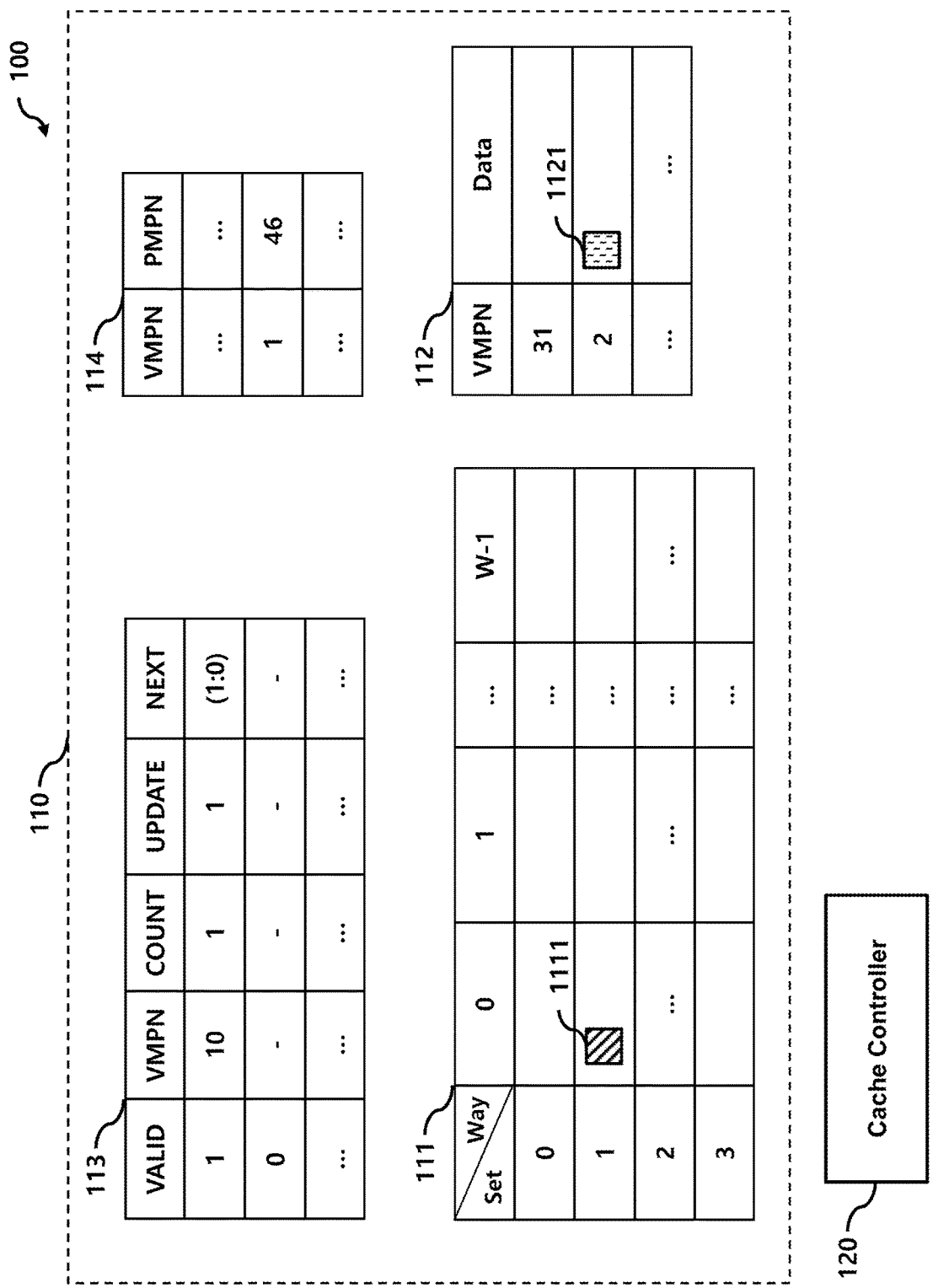

SEMICONDUCTOR DEVICE MANAGING ADDRESS MAPPING OF A SEMICONDUCTOR MEMORY DEVICE AND DATA STORAGE DEVICE INCLUDING THE SEMICONDUCTOR DEVICE

CROSS-REFERENCE TO RELATED APPLICATIONS

The present application claims priority under 35 U.S.C. § 119(a) to Korean Patent Application No. 10-2017-0173788, filed on Dec. 18, 2017, which is incorporated herein by reference in its entirety.

BACKGROUND

1. Technical Field

Various embodiments of the present disclosure relate to a semiconductor device that manages an address mapping of a semiconductor memory device, and to a data storage device including the semiconductor device.

2. Related Art

When a data storage device includes a memory device, such as a NAND flash memory device, the data storage device manages an address mapping for the memory device.

Such a data storage device manages address mapping information and updates the address mapping information when processing various requests corresponding to the memory device, such as read, write, and erase requests.

An amount of the address mapping information increases as the capacity of the data storage device increases.

Conventionally, address mapping information is stored in a separate storage device from the memory device in the data storage device. However, it is difficult to store the address mapping information in the separate storage device. As the amount of the address mapping information increases, overall performance of the data storage device degrades because of the management of the address mapping information.

SUMMARY

In accordance with the present teachings, a semiconductor device may include a mapping cache configured to cache mapping data stored in a memory device; and a cache controller configured to manage the mapping cache, wherein the mapping cache comprises a first cache including a plurality of cache blocks, each cache block storing first mapping information and a link for other cache block storing second mapping information having relationship with the first mapping information.

In accordance with the present teachings, a semiconductor device may comprise a mapping cache configured to cache mapping data stored in a memory device; and a cache controller configured to manage information stored in the mapping cache, wherein the mapping cache comprises: a first cache including a plurality of cache blocks, each of the plurality of cache blocks being accessed with a logical address; a second cache including a plurality of cache entries, each of the plurality of cache entries being accessed with a virtual address determined by the logical address; a first table storing link information on a cache block related to the virtual address; and a second table storing mapping information between the logical address and the virtual address, wherein an amount of mapping information stored in a cache block is smaller than an amount of mapping information stored in a cache entry, wherein each of the cache blocks in the first cache stores first mapping information and a link for other cache block storing second mapping information having a relationship with the first mapping information, and wherein relationship between cache blocks is decided according whether virtual addresses determined from logical addresses of the cache blocks are common.

In accordance with the present teachings, a data storage device may comprise a memory device including a normal data region and a mapping data region, the normal data region being configured to store normal data, the mapping data region being configured to store mapping data; a host request managing device configured to manage a read/write request from a host; a mapping managing device configured to cache a part of the mapping data and to manage mapping information according to a request from the host request managing device; and a memory controller configured to manage an operation of the memory device according to a request from at least one of the host request managing device and the mapping managing device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

FIG. 3 shows a block diagram illustrating a mapping managing device according to an embodiment of the present disclosure.

DETAILED DESCRIPTION

The following detailed description references the accompanying figures in describing exemplary embodiments consistent with this disclosure. The exemplary embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined only in accordance with the presented claims and equivalents thereof.

Figure 1:
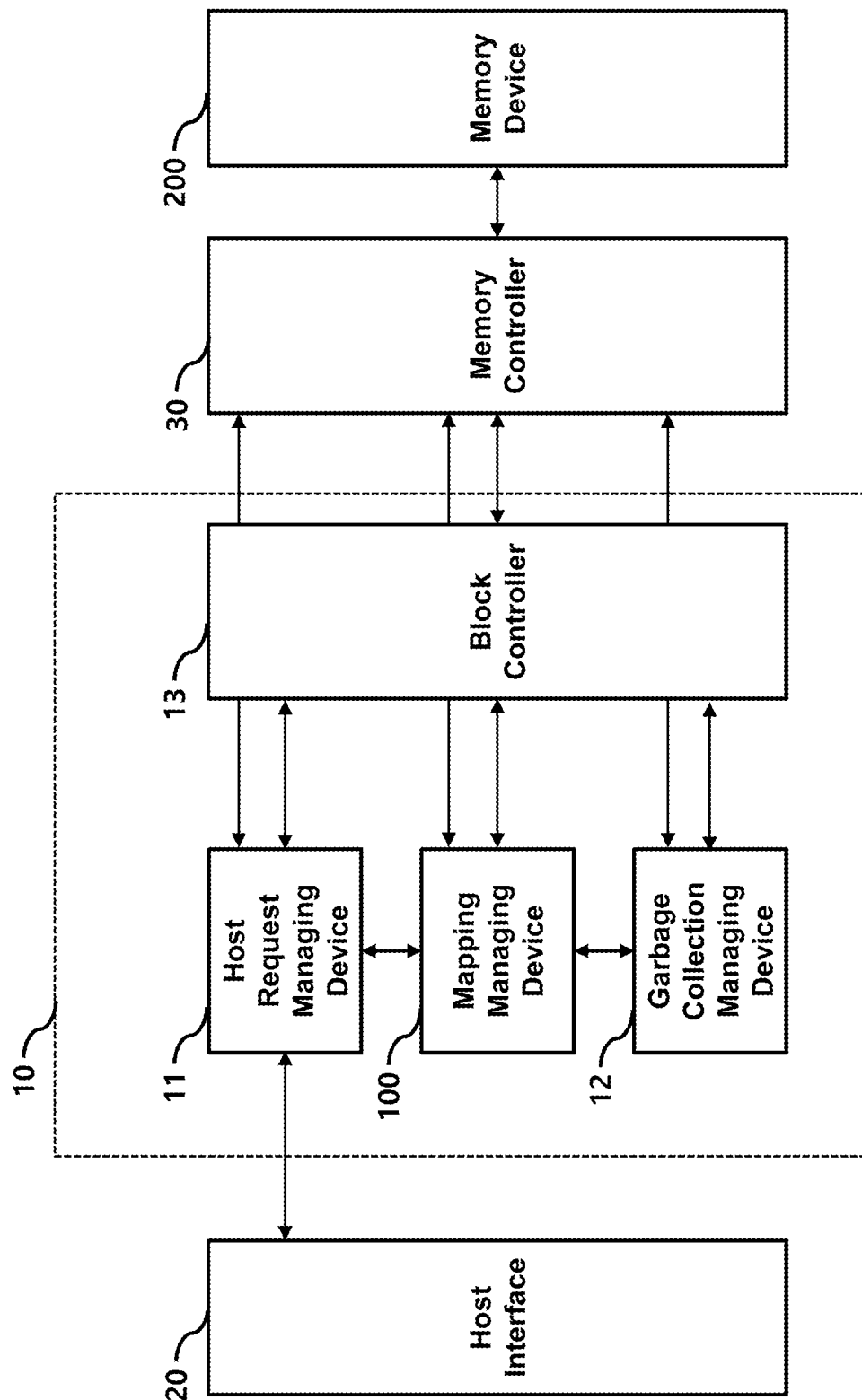
FIG. 1 shows a block diagram illustrating a data storage device according to an embodiment of the present disclosure.

FIG. 1 shows a block diagram illustrating a data storage device according to an embodiment of the present disclosure.

The data storage device includes a control device 10, a host interface 20, a memory controller 30, and a memory device 200.

The host interface 20 transfers a read/write request from a host (not shown) to the control device 10, and transfers a processing result provided by the control device 10 to the host.

In this embodiment, the memory device 200 is implemented with a flash memory device.

The memory controller 30 transfers a memory control command to the memory device 200 under the control of the control device 10, and transmits a result of processing the command from the memory device 200 to the control device 10.

When the memory device 200 is a flash memory device, the control device 10 may correspond to a Flash Translation Layer (FTL).

The control device 10 may be implemented as hardware, software, or a combination thereof to process a request provided by the host through the host interface 20.

The control device 10 includes a host request managing device 11 for managing requests provided by the host, such as a read/write request, a mapping managing device 100 for managing address mapping information (or mapping information) between logical addresses and physical addresses, and a garbage collection managing device 12 for managing a garbage collection operation.

The control device 10 further includes a block controller 13 for converting a write or program request into a flash program request. The write or program request is provided by at least one of the host request managing device 11, the mapping managing device 100, and the garbage collection managing device 12.

The block controller 13 provides the flash program request to the memory controller 30. The memory controller 30 controls the memory device 200 in accordance with the flash program request.

The host request managing device 11 manages the read/write request provided by the host.

For example, the host request managing device 11 refers to the mapping managing device 100 for a physical address corresponding to a logical address associated with a read request, and accordingly, the mapping managing device 100 provides the corresponding physical address to the host request managing device 11. The host request managing device 11 then provides the read request to the memory controller 30.

For example, the host request managing device 11 also provides a program request to the block controller 13 in response to a write request for writing first data. The block controller 13 allocates a physical address corresponding to a logical address associated with the program request, converts the program request into a flash program request, and transfers the flash program request to the memory controller 30.

When a flash program operation is completed in the memory device 200 in response to the flash program request, the memory controller 30 transmits a response to the block controller 13, and the block controller 13 transfers the response to the host request managing device 11.

The host request managing device 11 causes the mapping managing device 100 to update the physical address corresponding to the logical address.

The garbage collection managing device 12 performs the garbage collection operation to maintain the number of free blocks in the memory device 200 to be equal to or larger than a threshold value.

For example, the garbage collection operation may be performed when the number of free blocks in the memory device 200 decreases below the threshold value.

The mapping managing device 100 manages a mapping relationship between a logical address and a physical address.

In an embodiment of the present disclosure, the mapping managing device 100 includes a mapping cache therein. In some embodiments, the mapping managing device 100 refers to the mapping cache and a mapping data area in the memory device 200, and updates mapping information in the mapping cache, when the mapping managing device 100 is processing a read/write/garbage collection request.

The read request, which is provided by at least one of the host request managing device 11, the garbage collection managing device 12, and the mapping managing device 100, may be directly input to the memory controller 30 without conversion.

In contrast, the block controller 13 converts a write or program request provided by at least one of the host request managing device 11, the garbage collection managing device 12, and the mapping managing device 100 into a flash program request for managing a flash block.

The block controller 13 collects program requests and provides flash program requests corresponding to the collected program requests to the memory controller 30 to improve write performance.

The block controller 13 may simultaneously provide a plurality of flash program requests to the memory controller 30.

The block controller 13 manages information on each flash block, such as the number of valid pages in the flash block. The block controller 13 selects and erases blocks having no valid page, and selects a victim block in a garbage collection operation. A block having the least number of valid pages can be selected as a victim block.

The garbage collection managing device 12 performs the garbage collection operation, so that the block controller 13 manages a sufficient number of free blocks.

When the block controller 13 provides a victim block, the garbage collection managing device 12 refers to the mapping managing device 100 in order to determine whether there is a valid page in the victim block.

The garbage collection managing device 12 provides a mapping update request for the determined victim block including the valid page to the mapping managing device 100, and provides a program request for the victim block to the block controller 13.

Figure 2:
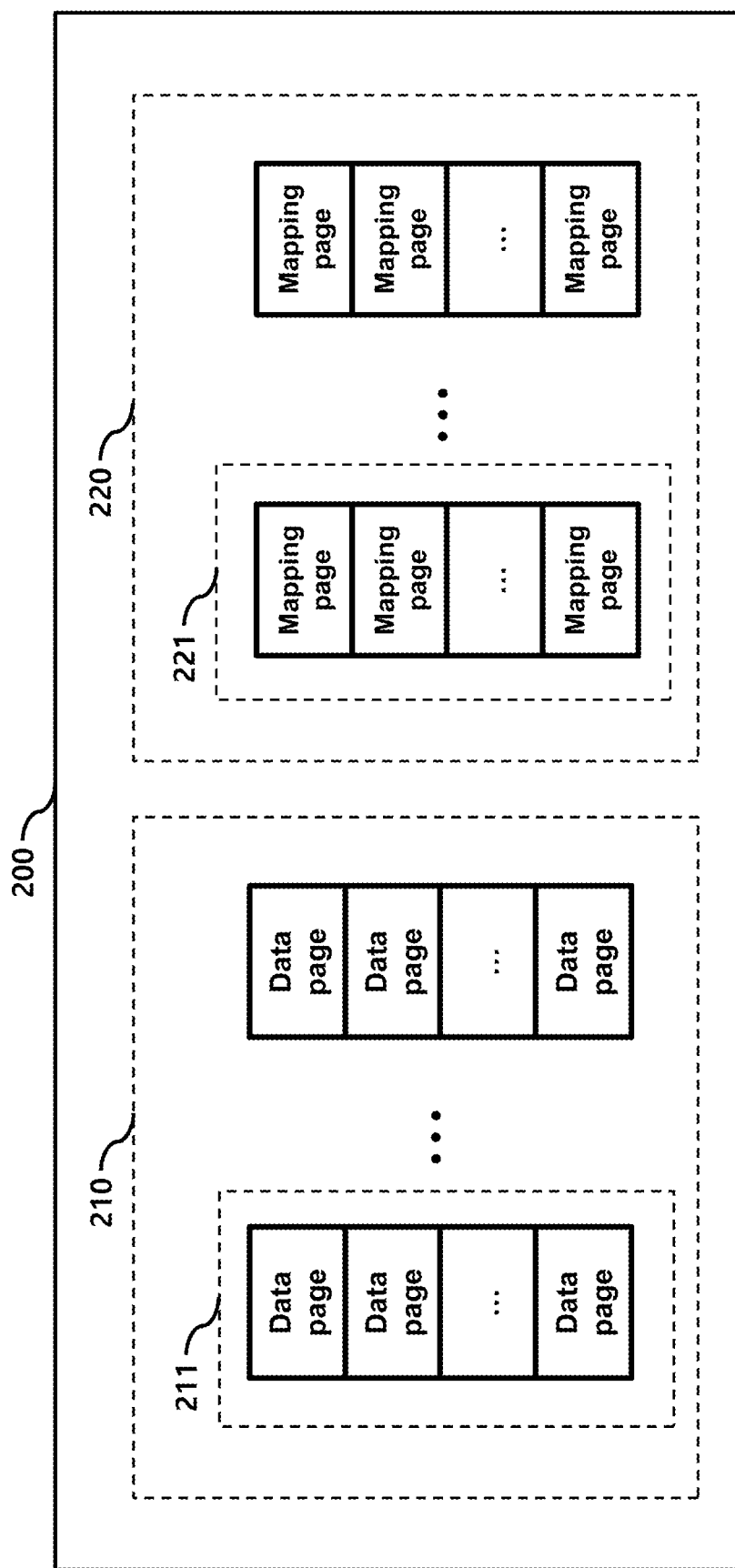
FIG. 2 shows a block diagram illustrating a flash memory device according to an embodiment of the present disclosure.

FIG. 2 shows a block diagram illustrating a memory device according to an embodiment of the present disclosure. The memory device shown in FIG. 2 may correspond to the memory device 200 in FIG. 1. The memory device 200 of FIG. 2 will be described with reference to FIG. 1.

The data storage device of FIG. 1 stores mapping information along with normal data in the memory device 200 instead of storing the mapping information in a separate storage device.

The memory device 200 includes a normal data area 210 and a mapping data area 220.

The normal data area 210 includes a plurality of data blocks 211 each including a plurality of data pages, and stores normal data processed according to a read/write request in the data pages. The "normal data" represents data to be read or written according to the read/write request, and is distinguished from mapping data used to perform a mapping operation between a logical address and a physical address.

The mapping data area 220 includes a plurality of mapping blocks 221, each of which includes a plurality of mapping pages, and stores the mapping information in the mapping pages.

The mapping managing device 100 of FIG. 1 stores the entire mapping information in the mapping data area 220, and stores some of the mapping information in the mapping cache of the mapping managing device 100.

When a cache miss occurs, the mapping managing device 100 provides a read request to the memory controller 30 to read out necessary mapping information from the mapping data area 220 of the memory device 200, and stores the read-out mapping information in the mapping cache. The cache miss represents a state where mapping information for processing a certain request is not found in the mapping cache of the mapping managing device 100.

FIG. 3 shows a block diagram illustrating a mapping managing device according to an embodiment of the present disclosure. The mapping managing device shown in FIG. 3 may correspond to the mapping managing device 100 of FIG. 1. The mapping managing device of FIG. 3 will be described with reference to FIGS. 1 and 2.

The mapping managing device 100 includes a mapping cache 110 and a cache controller 120.

The cache controller 120 controls an operation relating to the mapping cache 110, such as adding mapping information to the mapping cache 110 or updating mapping information stored in the mapping cache 110.

When the memory device 200 is accessed on a page basis, a logical address may be replaced with a logical page number, and a physical address may be replaced with a physical page number.

Accordingly, page numbers may be used instead of addresses, and addresses may be used instead of page numbers.

As described above with reference to FIG. 2, in this embodiment, the memory device 200 includes the normal data area 210 and the mapping data area 220.

Accordingly, the mapping managing device 100 manages mapping information for normal data and mapping data together.

To this end, the mapping managing device 100 manages address information such as a logical data page number (LDPN), a physical data page number (PDPN), and a physical mapping page number (PMPN).

The logical data page number corresponds to a logical address of data requested by the host, and the physical data page number corresponds to a physical address of the data stored in the normal data area 210.

A pair of the logical data page number and the physical data page number may constitute a mapping entry. The mapping entry is stored in the mapping data area 220.

The physical mapping page number indicates a physical address of a page in which the mapping entry is stored in the mapping data area 220.

In the present embodiment, it is assumed that four mapping entries are stored in one physical mapping page. However, other embodiments include a different number of mapping entries stored in one physical mapping page.

The mapping managing device 100 may use a virtual mapping page number (VMPN) to manage the physical mapping page number.

Hereinafter, the configuration and operation of the mapping managing device 100 will be described with an example where the host request managing device 11 of FIG. 1 requests mapping information to the mapping managing device 100.

In this embodiment, a single-level caching scheme or a multi-level caching scheme may be used to cache mapping entries.

In the present embodiment shown in FIG. 3, a two-level caching technique among the multi-level caching scheme is used, and accordingly, the mapping cache 110 includes a first cache 111 and a second cache 112.

The first cache 111 includes a plurality of cache blocks, and each cache block includes mapping data and corresponding metadata.

The mapping data of the cache block stores two consecutive physical data page numbers.

The metadata includes a flag indicating whether the cache block is in a dirty state, a flag indicating whether the cache block is used, and the like. When the cache block is in the dirty state, it may mean that some data stored in the cache block has changed, and needs to be flushed.

A data structure of a cache block of the first cache 111 will be described in detail with reference to FIGS. 4A and 4B.

In an embodiment, the first cache 111 has a structure of a set associative scheme. The first cache 111 may include a plurality of sets, and each of the plurality of sets may include a plurality of ways, e.g., W number of ways, W being a positive integer.

Accordingly, the host can automatically extract a set number from a requested logical data address and examine ways corresponding to the extracted set number to determine whether mapping information corresponding to the requested logical data address exists in the first cache 111.

When a cache miss occurs in the first cache 111, that is, when the mapping information corresponding to the requested logical data address does not exist in the first cache 111, the mapping information corresponding to the requested logical data address can be identified by referring to the second cache 112.

For example, when a cache miss occurs in a certain set of the first cache 111, a new cache block is allocated to an empty way in the certain set.

If an empty way does not exist in the certain set, a non-dirty way is selected and a new cache block is allocated to the selected non-dirty way in the certain set. The non-dirty way is a way that is not empty and not in a dirty state.

If there is no empty way in the certain set and all of the ways in the certain set are in a dirty state, an empty way is generated by evicting data in one of the ways in the certain set to the second cache 112.

A first data structure 1111 including information about a request, which caused a cache miss, is stored in a cache block, which has been newly allocated. The information about the request may include a request ID. At this time, the first data structure 1111 is stored in an area of the cache block where mapping data is stored.

The metadata of the cache block may further include flag bits to indicate whether the first data structure 1111 is stored because the cache miss has occurred.

In the present embodiment, since the information of the first data structure 1111 is stored in the cache block where the cache miss has occurred, a separate storage device for storing the information is not required.

In the second cache 112, each cache entry is stored in a location that corresponds to a virtual mapping page number (VMPN).

The cache entry of the second cache 112 stores mapping data and corresponding metadata.

In this embodiment, the mapping data of the second cache 112 includes four consecutive mapping entries each of which is a pair of a logical data page number and a physical data page number.

The number of mapping entries in the mapping data of the second cache 112 coincides with the number of mapping entries stored in one mapping page in the mapping data area 220 of the memory device 200.

The virtual mapping page number may be derived from the logical data page number according to a predetermined rule.

For example, if the logical data page number is 11, the virtual mapping page number is 2, which corresponds to a quotient of 11 divided by 4.

Accordingly, it is possible to determine whether a virtual mapping page number corresponding to a logical data page number exists in the second cache 112.

When a cache miss occurs in the second cache 112, a new cache entry is allocated to the second cache 112.

That is, the new cache entry is stored in a location that corresponds to a virtual mapping page number that is automatically determined, and mapping data read out from the mapping data area 220 of the memory device 200 is stored in the new cache entry.

The new cache entry may store a second data structure 1121 that contains information about the request that caused the cache miss in the first cache 111.

In some embodiments, the information about the request stored in the second data structure 1121 may include information about the position where the corresponding first data structure 1111 is stored, index information, and the like.

Accordingly, the information about the corresponding first data structure 1111 can be easily checked by referring to the information of the second data structure 1121, thereby confirming the information about the request that caused the cache miss.

In this embodiment, since the information of the second data structure 1121 is stored in a cache entry when the cache miss occurred, a separate storage device for storing the information is not required.

The mapping cache 110 further includes a second table 114. Data may be read from the mapping data area 220 of the memory device 200 by referring to the second table 114.

The second table 114 is a mapping table for storing a relationship between a virtual mapping page number and a physical mapping page number.

Information in the second table 114 should be stored in a separate area provided in the mapping data area 220 of the memory device 200, or in a separate nonvolatile memory device when the data storage device is powered off.

When the power is applied and the data storage device is initialized, the second table 114 may be recovered from mapping information stored in the separate area in the memory device 200 or the separate nonvolatile memory device, so that the second table 114 may store all virtual mapping page numbers and all physical mapping page numbers.

Accordingly, by referring to the second table 114, a physical mapping page number corresponding to a virtual mapping page number can be confirmed.

Then, the mapping managing device 100 generates a read request to the memory controller 30 for the identified physical mapping page number.

Mapping data, which are read out from the mapping data area 220 of the memory device 200 in response to the read request, are stored in a mapping data area of a cache entry in the second cache 112. The cache entry corresponds to the virtual mapping page number that corresponds to the identified physical mapping page number.

The second cache 112 refers to the information of the second data structure 1121, and stores a portion of physical data page numbers in the mapping data that are read out from the mapping data area 220 of the memory device 200 in a corresponding cache block of the first cache 111. The portion of the physical data page numbers corresponds to information requested by the first cache 111.

The first cache 111 identifies a request for the information by referring to the first data structure 1111, and outputs a physical data page number as a response to the request.

The mapping cache 110 may further include a first table 113. When information of the first cache 111 is updated, information of the first table 113 can be updated together with the information of the first cache 111.

The first table 113 manages information on a status of a virtual mapping page number.

To this end, the first table 113 includes a valid field VALID, a virtual mapping page number field VMPN, a count field COUNT indicating the number of cache blocks associated with the virtual mapping page number, an update field UPDATE indicating an update status of the virtual mapping page number, and a link field NEXT.

The link field NEXT of the first table 113 includes a link to a cache block of the first cache 111 included in the virtual mapping page number. For example, the link indicates a dirty cache block sharing a same virtual mapping page number.

At this time, the link indicates one cache block among cache blocks of the first cache 111 that share the virtual mapping page number.

A cache block of the first cache 111 further stores a link to the next cache block that shares the virtual mapping page number.

Accordingly, when a cache block is selected in the first cache 111, all cache blocks sharing the virtual mapping page number are quickly determined by referring to link information of the first cache 111 and the first table 113.

For example, when storing new mapping information in a cache block in the first cache 111, it is determined whether a valid virtual mapping page number exists in the first table 113.

If there is no entry corresponding to the valid virtual mapping page number in the first table 113, a new entry is added to the first table 113, and an address, for example, a set number and a way number, of the cache block of the first cache 111 in which the new mapping information is stored is stored in a link field of the new entry of the first table 113.

If there is an entry corresponding to the valid virtual mapping page number in the first table 113, a link field of the corresponding entry of the first table 113 and a link field included in the cache block of the first cache 111 are used to search a last-connected cache block. The address of the cache block, for example the set number and the way number, of the first cache 111 in which the new mapping information is stored is stored in a link field of the last-connected cache block.

When a cache miss occurs in the first cache 111 or in the second cache 112 as a read or write request is being processed, there may not be any free space in the first cache 111 and in the second cache 112 to store new information.

In this case, it may be necessary to select a victim cache block or a victim cache entry, and to update information stored in the victim cache block or the victim cache entry with the new information.

It is possible to select the least recently used (LRU) cache block or cache entry, among cache blocks or cache entries that are not in a dirty state, as a victim cache block or victim cache entry. The last time that the LRU cache block or cache entry has been used is the earliest time among the cache blocks or cache entries, for example. This is because when the dirty cache block or cache entry is selected, a processing time of a read or write request increases due to a time required to update the dirty cache block or cache entry, thereby degrading overall performance.

To prevent this performance degradation, the first cache 111 and the second cache 112 may perform a flush operation to keep the number of non-dirty cache blocks more than a predetermined threshold value.

The flushing operation may be performed in an idle state to prevent degradation of the system performance, but embodiments are not limited thereto.

The flush operation may include a first flush operation for flushing a cache block of the first cache 111 and a second flush operation for flushing a cache entry of the second cache 112.

The first flush operation is an operation of storing, in the second cache 112, data or information stored in a cache block, which is selected as a victim cache block in the first cache 111, and data or information stored in cache blocks that share the same virtual mapping page number.

Information about the virtual mapping page number corresponding to the victim cache block that is in the first table 113 is invalidated.

The second flush operation is an operation to program information about an area of the second cache 112 that is selected as a victim cache entry into the mapping data area 220 of the memory device 200.

Since a physical mapping page number is newly allocated, information on virtual mapping page numbers and physical mapping page numbers in the second table 114 is updated.

Figure 4A:
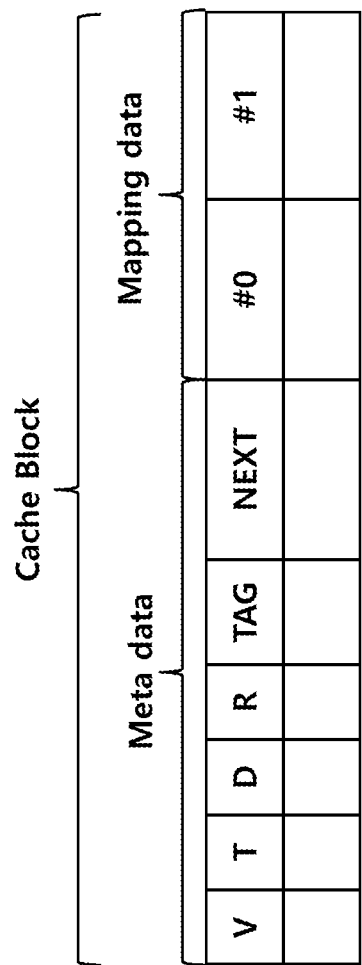
FIGS. 4A and 4B show a structural diagram illustrating a first cache according to an embodiment of the present disclosure.
Figure 4B:
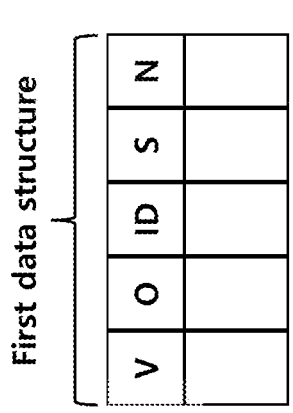

FIGS. 4A and 4B show structural diagrams illustrating a first cache according to an embodiment of the present disclosure. FIG. 4A illustrates a cache block, and FIG. 4B illustrates a first data structure. The first cache of FIGS. 4A and 4B may correspond to the first cache 111 of FIG. 3.

Referring to FIG. 4A, the cache block includes a mapping data area and a metadata area.

As described above with reference to FIG. 3, in this embodiment, the mapping data area of the cache block includes two mapping entries.

The metadata area includes a valid field V, a field T indicating a cache miss status, a field D indicating a dirty state, a field R indicating a recent usage, a TAG field, and a link field NEXT.

The link field NEXT indicates a cache block next to a current cache block, the next cache block and the current cache block sharing the same virtual mapping page number.

Referring to FIG. 4B, the first data structure includes a valid field V and a field ID indicating an ID of a request.

The first data structure may further include a field O indicating a kind of the request, a field S indicating a starting logical address of the request, and a field N indicating a length of data corresponding to the request.

The fields of the first data structure are stored in the mapping data area of the cache block when the field T indicating the cache miss status is in a set state, i.e., when a cache miss has occurred. Therefore, a separate storage device is not required to store the fields of the first data structure.

When the field T indicating the cache miss status is in a reset state, i.e., when the cache miss has not occurred, a mapping entry is stored in the mapping data area of the cache block.

Figure 5A:
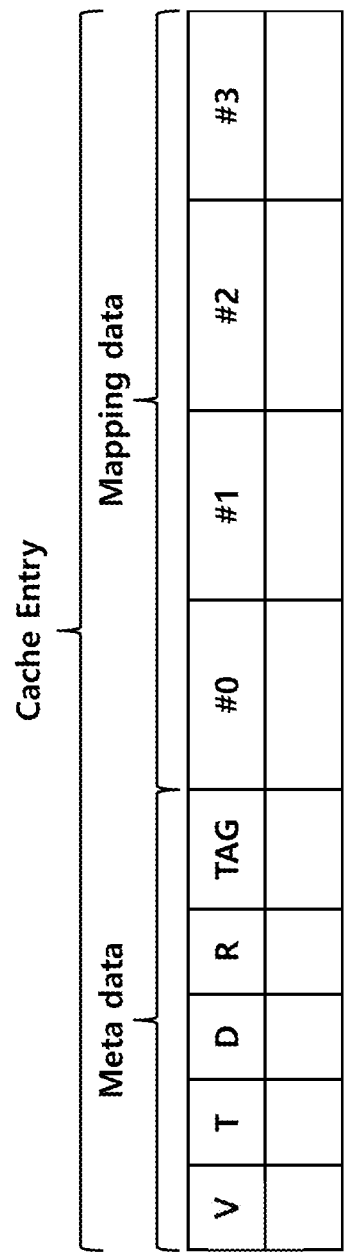
FIGS. 5A and 5B show a structural diagram illustrating a second cache according to an embodiment of the present disclosure.
Figure 5B:
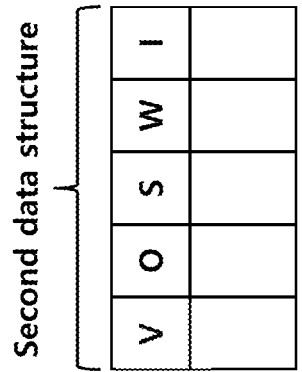

FIGS. 5A and 5B show structural diagrams illustrating a second cache according to an embodiment of the present disclosure. FIG. 5A illustrates a cache entry, and FIG. 5B illustrates a second data structure. The second cache of FIGS. 5A and 5B may correspond to the second cache 112 of FIG. 3.

Referring to FIG. 5A, the cache entry includes a mapping data area and a metadata area.

As described above with reference to FIG. 3, in this embodiment, the mapping data area of the cache entry includes four mapping entries.

The metadata area includes a valid field V, a field T indicating a cache miss status, a field D indicating a dirty status, a field R indicating a recent usage, and a tag field TAG.

Referring to FIG. 5B, the second data structure includes a valid field V, a field S indicating a set number of a cache block of the first cache 111 that referred to the second cache 112, and a field W indicating a way number of the cache block of the first cache 111 that referred to the second cache 112.

The second data structure may further include a field O indicating a type of a request, and an index field I.

The type of the request indicates a data request from the first cache 111.

The index field I indicates a portion to be stored in a cache block of the first cache 111 among the cache entries of the second cache 112, and the first cache 111 provides index information to be stored in the index field I. The index information may be automatically calculated using a logical data page number.

In this embodiment, the cache entry of FIG. 5A stores four consecutive mapping entries, and the cache block of FIG. 4A stores two consecutive mapping entries. In this case, the index field I includes information that is 0 or 1.

Referring to FIG. 5A, the index information "0" corresponds to mapping entries #0 and #1 in the cache entry, and the index information "1" corresponds to mapping entries #2 and #3 in the cache entry.

The second data structure of FIG. 5B is stored in the mapping data area of the cache entry when the field T indicating the cache miss status is in a set state. Therefore, a separate storage device is not required to store the second data structure.

When the field T indicating the cache miss status is in a reset state, a mapping entry is stored in the mapping data area of the cache entry.

Figure 6:
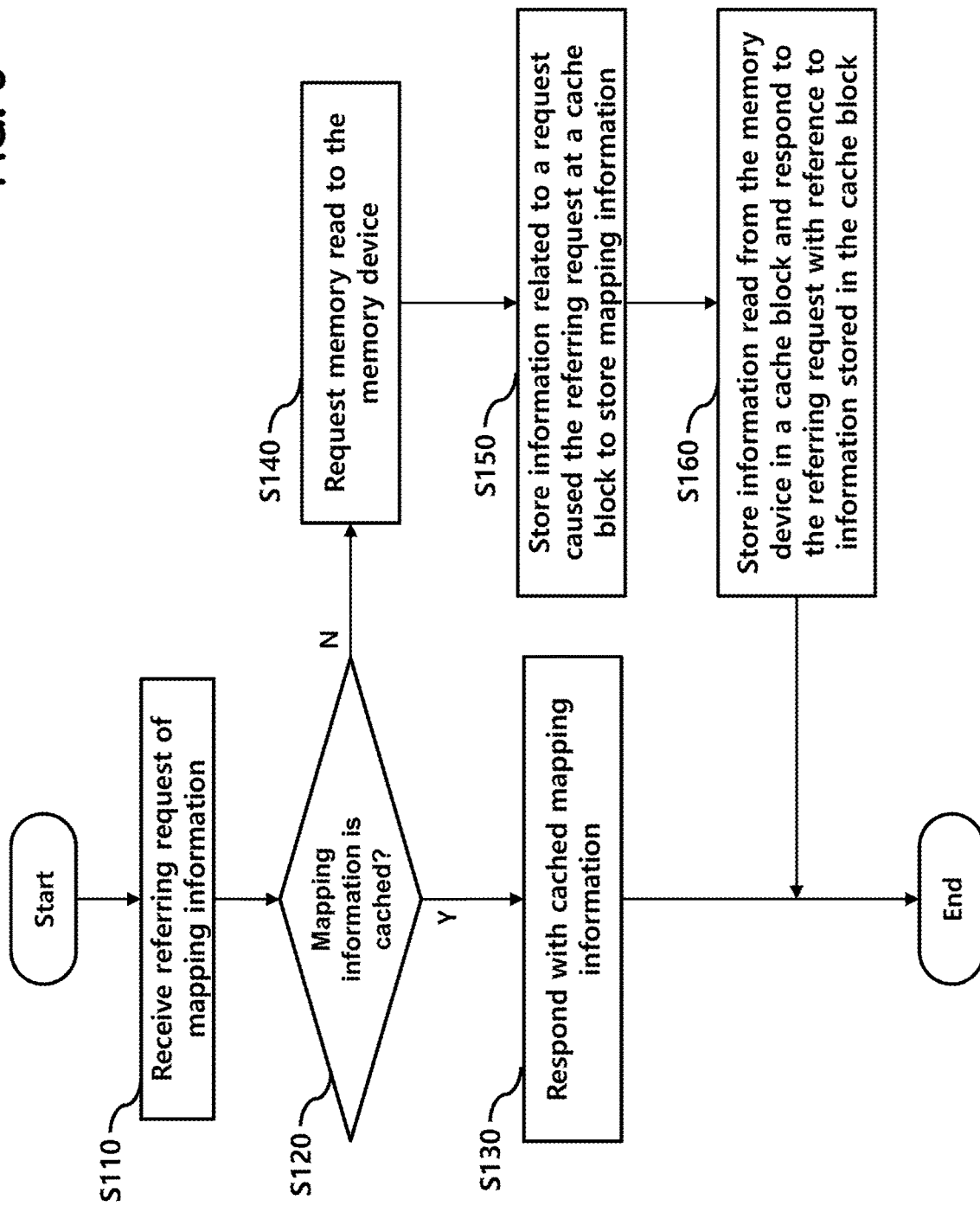
FIGS. 6 to 8 show flow charts illustrating operations of a mapping managing device according to an embodiment of the present disclosure.

FIG. 6 shows a flow chart illustrating a referring operation of a mapping managing device according to an embodiment of the present disclosure. The mapping managing device described with reference to FIG. 6 may correspond to the mapping managing device 100 described above with reference to FIGS. 1, 3, 4A, 4B, 5A, and 5B.

First, the mapping managing device 100 receives a referring request at step S110. The referring request may be provided from the host request managing device 11 or the garbage collection managing device 12.

The mapping managing device 100 determines whether mapping information corresponding to the referring request is cached at step S120. That is, at step S120, it is determined whether a physical data page number corresponding to a logical data page number requested by the referring request exists in the mapping cache 110 of the mapping managing device 100.

If the mapping information is cached, i.e., if the corresponding physical data page number is found in the mapping cache 110, the mapping cache 110 responds to the referring request using the cached mapping information at step S130.

If the mapping information is not cached, i.e., if the corresponding physical data page number is not found in the mapping cache 110, the mapping managing device 100 transmits a read request to the memory device 200 in order to read out the mapping information stored in the mapping data area 220 of the memory device 200 at step S140.

A memory address of the mapping data area 220 in which the mapping information is stored can be confirmed by referring to the second table 114 as described above with reference to FIG. 3.

Then, the mapping managing device 100 may store information about the referring request in a cache block or cache entry, in which the mapping information read out from the mapping data area 220 is to be stored, at step S150. This operation of storing the information about the referring request may be accomplished by storing the first data structure 1111 containing the information about the referring request in the cache block of the first cache 111, or by storing the second data structure 1121 in the cache entry of the second cache 112.

After then, when the mapping information is obtained from the mapping data area 220 of the memory device 200, the mapping managing device 100 may refer to the first data structure 1111 stored in the cache block or the second data structure 1121 stored in the cache entry and provide a quick response to the referring request at step S160.

Figure 7:
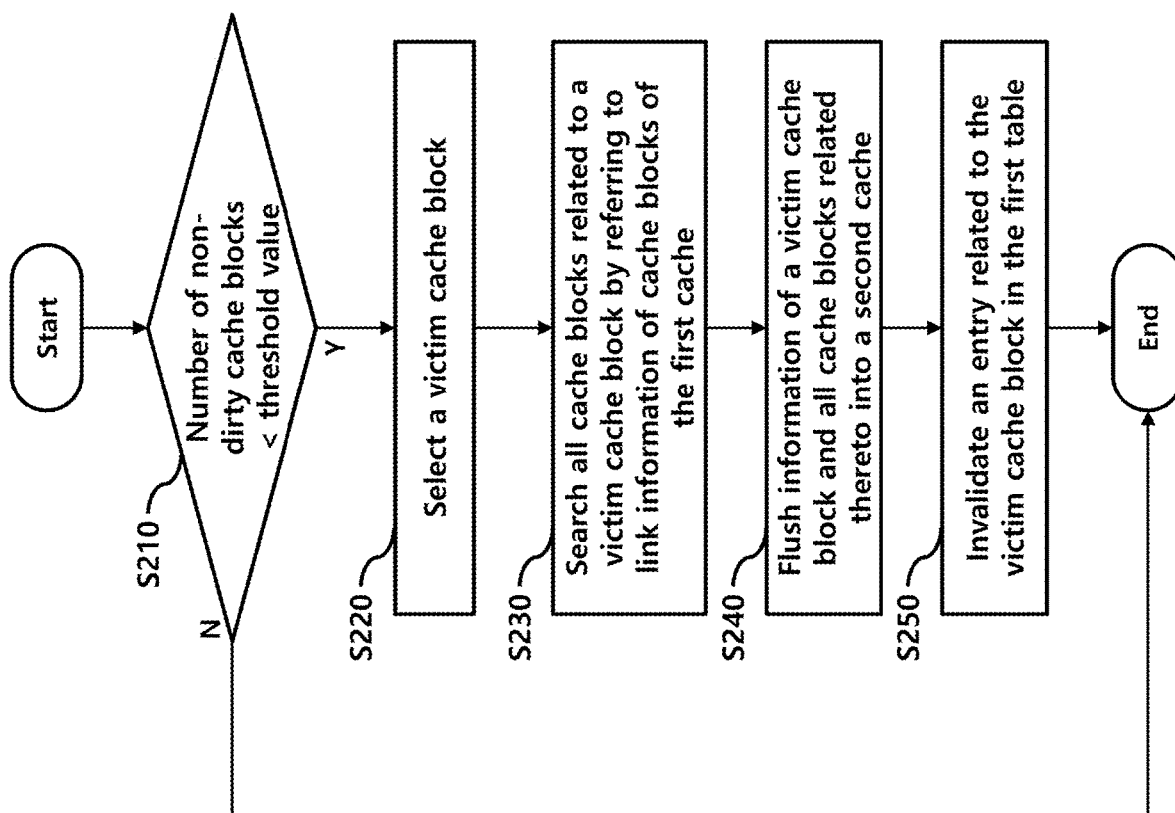

FIG. 7 shows a flow chart illustrating a flush operation of a first cache according to an embodiment of the present disclosure. The first cache to be described with reference to FIG. 7 may correspond to the first cache 111 described above with reference to FIGS. 3, 4A, and 4B.

First, it is determined whether the number of non-dirty cache blocks in the first cache 111 is smaller than a threshold value at step S210.

If the number of non-dirty cache blocks is greater than or equal to the threshold value, the process terminates.

If the number of non-dirty cache blocks is smaller than the threshold value, a victim cache block is selected from cache blocks of the first cache 111 at step S220.

In order to select the victim cache block, the least recently used cache block among dirty cache blocks in the first cache 111 may be selected by referring to metadata of the cache blocks in the first cache 111.

When the victim cache block is selected, it is possible to find a cache block that is located at a first position among cache blocks sharing the same virtual mapping page number, by referring to the first table 113. Thereafter, cache blocks sharing the same virtual mapping page number with the victim cache block may be sequentially found by referring to link information of the cache blocks of the first cache 111, at step S230. The cache blocks sharing the same virtual mapping page number with the victim cache block are referred to as "associated cache blocks."

Then, information stored in the victim cache block and information stored in the associated cache blocks are flushed to the second cache 112 at step S240.

At this time, metadata of a cache entry in the second cache 112, in which the flushed information is stored, may be updated to a dirty state.

Thereafter, an entry, e.g., information corresponding to the virtual mapping page number, which is shared by the victim cache block and the associated cache blocks and stored in the first table 113, is invalidated at step S250.

Figure 8:
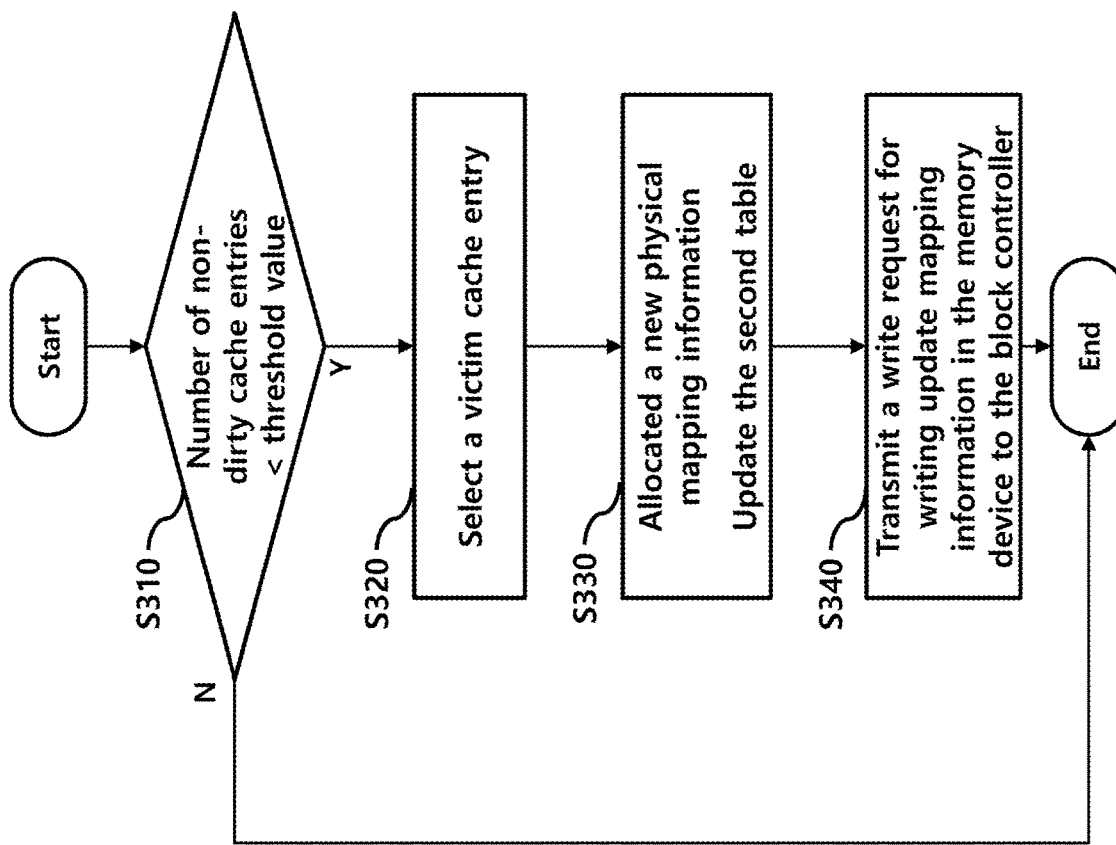

FIG. 8 shows a flow chart illustrating a flush operation of a second cache according to an embodiment of the present disclosure. The second cache to be described with reference to FIG. 8 may correspond to the second cache 112 described above with reference to FIGS. 3, 5A, and 5B.

First, it is determined whether the number of non-dirty cache entries in the second cache 112 is smaller than a threshold value at step S310.

If the number of non-dirty cache entries is not smaller than the threshold value, the process terminates.

If the number of non-dirty cache entries is smaller than the threshold value, a victim cache entry to be evicted is selected from cache entries in the second cache 112 at step S320.

Metadata of the cache entries in the second cache 112 may be referenced in order to select, as the victim cache entry, the least recently used cache entry among dirty cache entries in the second cache 112.

When the victim cache entry is selected, a new physical mapping page number is allocated and the second table 114 is updated with the new physical mapping page number at step S330.

Thereafter, a write request for writing updated mapping information in the memory device 200 is transmitted to the block controller 13 of FIG. 1 at step S340. At this time, the block controller 13 can invalidate the existing physical mapping page number in the second table 114.

A data storage device according to the embodiments of the present disclosure does not require a separate storage device for storing mapping information by storing the mapping information in a memory device storing normal data.

A semiconductor device according to the embodiments of the present disclosure prevents read/write performance of a memory device from being degraded due to a process of caching mapping information by efficiently managing the mapping information using the memory device.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A semiconductor device, comprising:
   a mapping cache configured to cache mapping data stored in a memory device; and
   a cache controller configured to manage the mapping cache,
   wherein the mapping cache comprises a first cache including a plurality of cache blocks, each cache block storing first mapping information and a link for another cache block storing second mapping information having a relationship with the first mapping information, each of the first mapping information and the second mapping information representing a relationship between a logical address and a physical address.

2. The semiconductor device of claim 1, wherein the mapping cache further comprises a first table including a plurality of entries, each of the plurality of entries storing a status of mapping information and a link to a cache block of the first cache sharing the mapping information thereof.

3. The semiconductor device of claim 1, wherein the cache controller stores a first data structure including information on a cache failed request that has caused a cache miss in a certain cache block when the cache miss has occurred in the certain cache block of the first cache.

4. The semiconductor device of claim 3, wherein the cache controller provides a read request for reading out mapping data to the memory device and provides a response to the cache failed request by referring to the first data structure, when the cache miss has occurred.

5. The semiconductor device of claim 1, wherein a cache block included in the first cache further stores information on a dirty status of the cache block, and the cache controller, when a number of non-dirty cache blocks in the first cache is smaller than a threshold value, selects a victim cache block in the first cache and evicts the victim cache block and another cache block having a relationship with the victim cache block from the first cache.

6. The semiconductor device of claim 1, wherein the relationship between the first mapping information and the second mapping information is determined according to physical addresses of a mapping data area in the memory device in which the first mapping information and the second mapping information are stored.

7. A semiconductor device, comprising:
a mapping cache configured to cache mapping data stored in a memory device; and
a cache controller configured to manage information stored in the mapping cache,
wherein the mapping cache comprises:
a first cache including a plurality of cache blocks, each of the plurality of cache blocks being accessed with a logical address;
a second cache including a plurality of cache entries, each of the plurality of cache entries being accessed with a virtual address determined by the logical address;
a first table storing link information on a cache block related to the virtual address; and
a second table storing mapping information between the logical address and the virtual address,
wherein an amount of mapping information stored in a cache block is smaller than an amount of mapping information stored in a cache entry,
wherein each of the cache blocks in the first cache stores first mapping information and a link for another cache block storing second mapping information having a relationship with the first mapping information, and
wherein a relationship between cache blocks is decided according whether virtual addresses determined from logical addresses of the cache blocks are common.

8. The semiconductor device of claim 7, wherein the cache controller stores a first data structure including information on a cache failed request that has caused a cache miss in a certain cache block of the first cache when the cache miss has occurred in the certain cache block of the first cache.

9. The semiconductor device of claim 8, wherein the cache controller refers to the second cache when the cache miss has occurred in the certain cache block of the first cache according to a virtual address corresponding to the certain cache block.

10. The semiconductor device of claim 9, wherein the cache controller stores a second data structure including information on a cache block of the first cache that has caused a cache miss in a certain cache entry of the second cache when the cache miss has occurred at the certain cache entry of the second cache.

11. The semiconductor device of claim 10, wherein the cache controller provides a read request for reading out mapping data to the memory device when the cache miss has occurred at the certain cache entry of the second cache.

12. The semiconductor device of claim 11, wherein the cache controller updates information in the certain cache entry of the second cache and the certain cache block of the first cache with the mapping data read out from the memory device in response to the read request, and provides the mapping data in response to the cache failed request by referring to the first data structure and the second data structure.

13. The semiconductor device of claim 12, wherein the cache controller updates link information of the first table that corresponds to the certain cache block of the first cache, or updates link information of the certain cache block of the first cache.

14. The semiconductor device of claim 7, wherein the cache controller selects a victim cache block in the first cache and evicts the victim cache block and other cache blocks having a relationship with the victim cache block to the second cache by referring to the link information of the first table and link information of the first cache when a number of non-dirty cache blocks in the first cache is smaller than a threshold value.

15. The semiconductor device of claim 7, wherein the cache controller selects a victim cache entry in the second cache and evicts the victim cache entry to the memory device when a number of non-dirty cache entries in the second cache is smaller than a threshold value.

* * * * *